United States Patent [19]

Schaner et al.

[11] Patent Number: 5,738,949
[45] Date of Patent: Apr. 14, 1998

[54] INDUCTIVE COMPONENT HAVING A CORE FORMED OF HIGH-PERMEABILITY MNZN FERRITES AND ENCAPSULATED WITH INSULATING MATERIAL

[75] Inventors: Dieter Schaner, Kraiburg; Armin Schweiger, München; August Beer, Deisenhofen, all of Germany

[73] Assignee: Siemens Matsushita Components GmbH & Co. KG, Munich, Germany

[21] Appl. No.: 586,565

[22] Filed: Jan. 16, 1996

Related U.S. Application Data

[63] Continuation-in-part of PCT/DE94/00801, Jul. 12, 1994.

[30] Foreign Application Priority Data

Jul. 12, 1993 [DE] Germany .......................... 43 23 279.5

[51] Int. Cl.[6] ........................................................ B32B 18/00

[52] U.S. Cl. ........................ 428/697; 428/412; 428/702; 252/62.59

[58] Field of Search ................................ 428/689, 412, 428/697, 702; 252/62.59, 62.54, 62.57

[56] References Cited

U.S. PATENT DOCUMENTS

| | | | |
|---|---|---|---|
| 4,246,128 | 1/1981 | Gallagher | 252/62.57 |
| 5,138,546 | 8/1992 | Johnson | 363/131 |

*Primary Examiner*—Timothy Speer
*Attorney, Agent, or Firm*—Herbert L. Lerner; Laurence A. Greenberg

[57] ABSTRACT

An inductive component includes a core being formed of high-permeability MnZn ferrites having a secondary permeability maximum at a temperature <0° C. Electrically insulating material encapsulates the core.

4 Claims, 2 Drawing Sheets

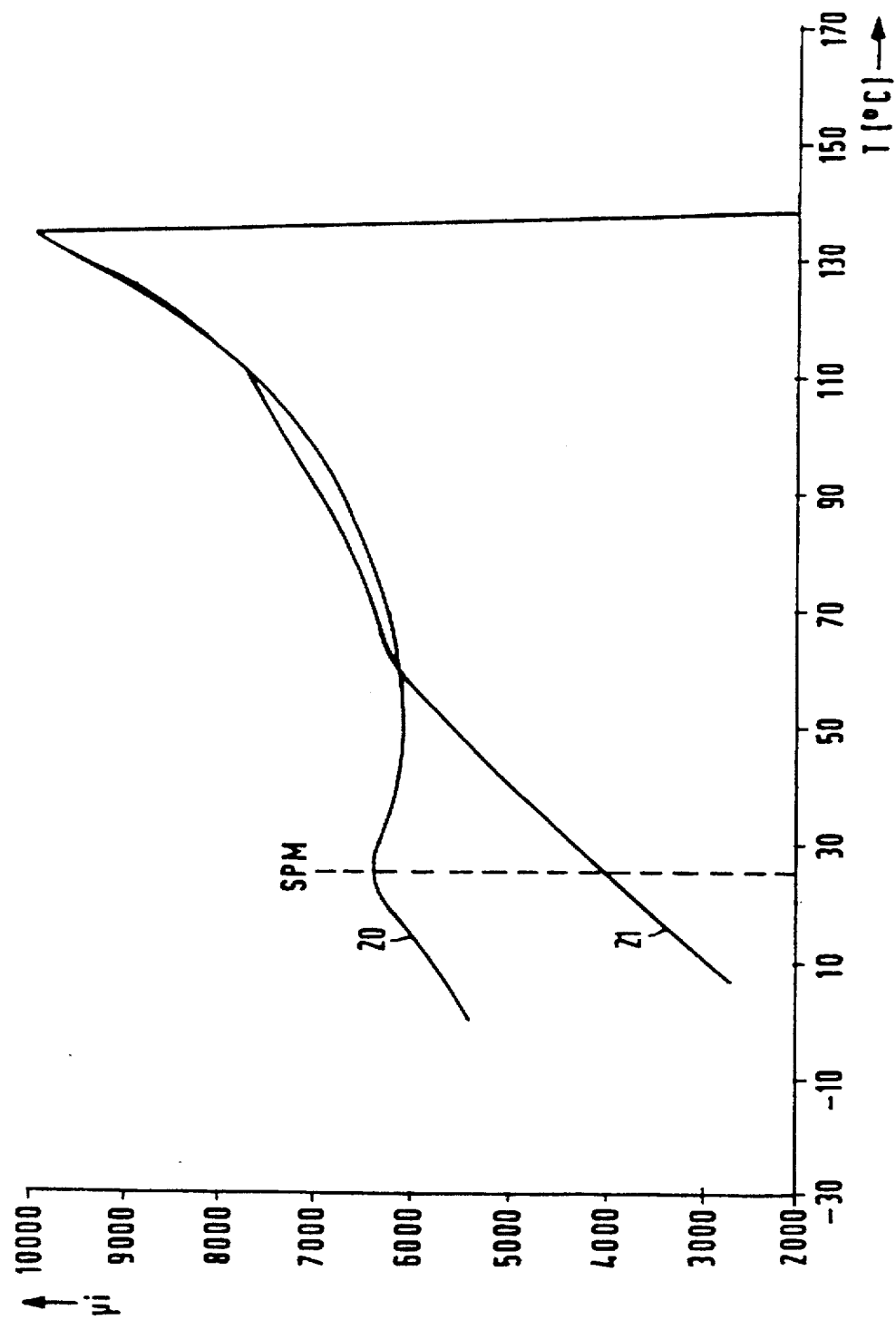

INDUCTIVE COMPONENT HAVING A CORE FORMED OF HIGH-PERMEABILITY MNZN FERRITES AND ENCAPSULATED WITH INSULATING MATERIAL

CROSS-REFERENCE TO RELATED APPLICATION

This application is a Continuation-in-part of International Application PCT/DE94/00801, filed Jul. 12, 1994.

BACKGROUND OF THE INVENTION

FIELD OF THE INVENTION

The present invention relates to an inductive component having a core being formed of high-permeability MnZn ferrites (manganese-zinc ferrites) and being encapsulated with insulating material.

High-permeability and ultrahigh-permeability MnZn ferrite cores are, in inductive components, frequently encapsulated or potted with an insulating material in order to achieve a sufficiently high electrical insulation strength. Plastics, for example epoxy resins, are customarily used as the insulating materials. However, as the encapsulation or potting compound cures, a shrinkage process sets in, so that the encapsulated cores are subjected all around to a mechanical pressure. Under the effect of this pressure loading, the inductance of the ferrite cores, and therefore of the inductive components, is indeterminately reduced by up to 20 to 30%.

SUMMARY OF THE INVENTION

It is accordingly an object of the invention to provide an inductive component having a core being formed of high-permeability MnZn ferrites and being encapsulated with insulating material, which overcomes the hereinafore-mentioned disadvantages of the heretofore-known devices of this general type and which provides a largely pressure-independent inductance of the cores and therefore of the inductive components containing them, when potting with insulating material.

With the foregoing and other objects in view there is provided, in accordance with the invention, an inductive component, comprising a core formed of high-permeability MnZn ferrites having a secondary permeability maximum at a temperature <0° C.; and electrically insulating material, especially plastic, encapsulating the core.

In accordance with another feature of the invention, the ferrites have an $Fe_2O_3$ content in a range of 50 to 55 mol %, a MnO content of 15 to 35 mol %, and a ZnO content of 15 to 35 mol %.

In accordance with a concomitant feature of the invention, the ferrites have an $Fe_2O_3$ content of 53.20 mol %, a MnO content of 24.80 mol %, and a ZnO content of 22.00 mol %.

Other features which are considered as characteristic for the invention are set forth in the appended claims.

Although the invention is illustrated and described herein as embodied in an inductive component having a core being formed of high-permeability MnZn ferrites and being encapsulated with insulating material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagram corresponding to the diagram according to FIG. 1, for MnZn ferrite having a secondary permeability maximum at a temperature >0° C.

DESCRIPTION OF THE PREFERRED EMBODIMENTS

Figure 1:
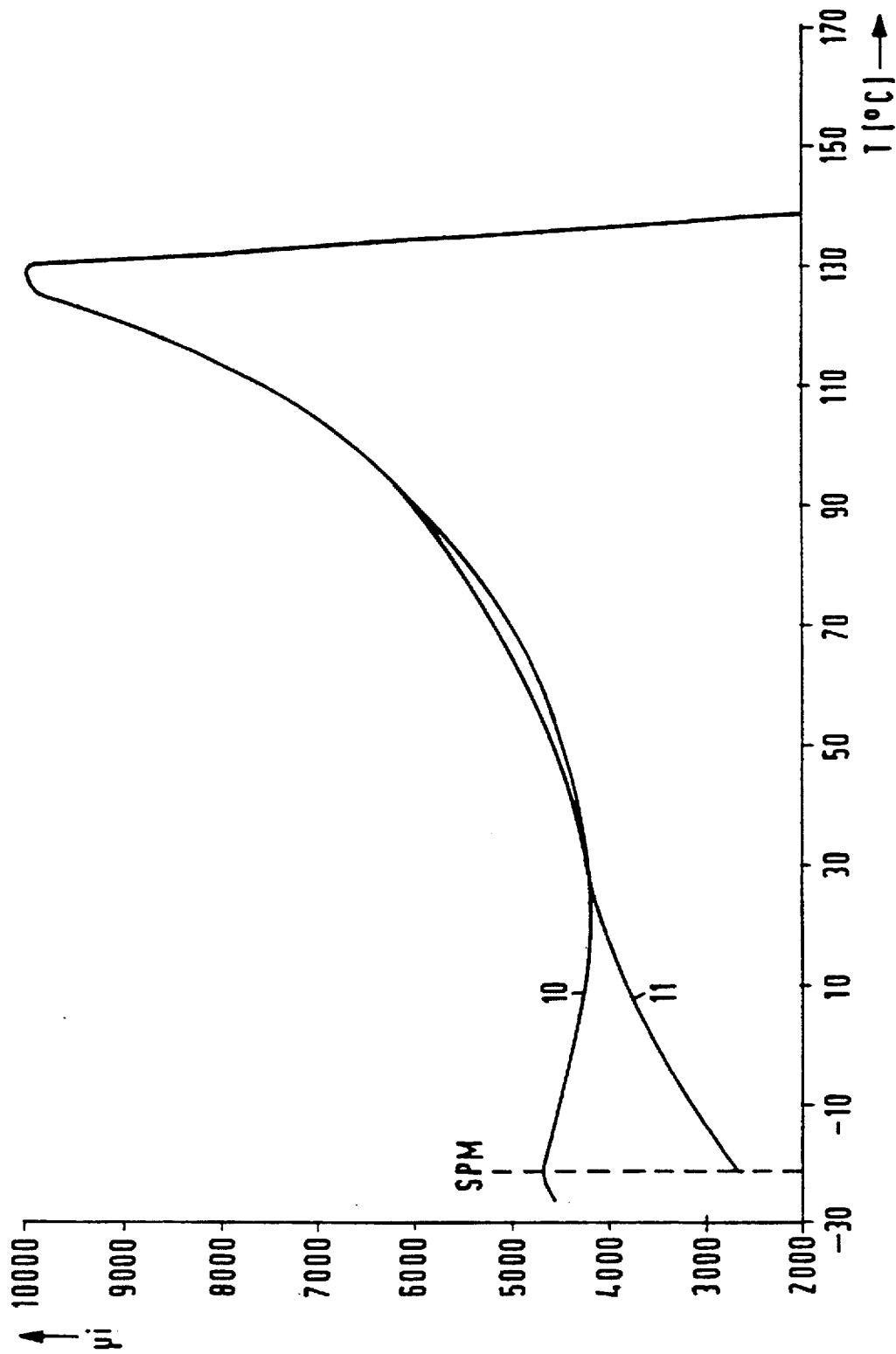
FIG. 1 is a diagram showing a dependence of an initial permeability μi on a temperature T in °C. of MnZn ferrite having a predetermined composition, with a secondary permeability maximum at a temperature <0° C. according to the invention.

Referring now in detail to the figures of the drawings as a whole, it is noted that for the relationship between an initial permeability μi and a temperature T which is known per se, reference is made, for example, to a book entitled: "Ferritkerne Grundlagen, Dimensionierung, Anwendungen in der Nachrichtentechnik" [Ferrite Cores, Basics, Design and Applications in Data Technology] by Kampczyk and öβ, Siemens Aktiengesellschaft, Berlin and Munich, 1978, pages 99 to 103, and in particular page 101. The relationship in this case is generally such that the initial permeability, starting from small values at low temperatures, increases continuously, reaches a maximum slightly below the Curie temperature and then decreases rapidly. In the case of high-iron MnZn ferrites, a secondary maximum in the permeability occurs when the crystal anisotropy crosses zero at low temperatures. With increasing iron content, this zero-crossing of the crystal anisotropy and the secondary permeability maximum are shifted to lower temperatures. It is known per se that the secondary permeability maximum can also be at negative temperatures on the Celsius scale.

Studies on which the invention is based have now surprisingly shown that when the position of the secondary permeability maximum is at temperatures T <0° C., the inductance changes which are due to the effect of mechanical pressure are considerably reduced. The invention therefore provides for the use of high-permeability MnZn ferrites having such a secondary permeability maximum at a temperature <0° C. for ferrite cores of inductive components, wherein the ferrite cores are encapsulated or potted with electrically insulating material. The secondary permeability maximum in this case can be fixed in a way that is clear to a person of skill in the art, by a suitable selection of molar ratios of $Fe_2O_3$ (iron oxide), MnO (manganese oxide) and ZnO (zinc oxide).

To date, in the case of most MnZn ferrite materials, consideration has only been given to the secondary permeability maximum in the temperature range T of >0° C., in order to achieve the highest possible permeabilities of approximately 5,000 to 15,000 in the room temperature range. In the case of transformer materials, the losses are a minimum approximately at the temperature of the secondary permeability maximum. Since the operating temperatures for transformers with ferrite cores are approximately in the range of 40° to 120° C., these materials have secondary permeability maxima in the same temperature range.

It is indeed true that MnZn ferrites having a secondary permeability maximum at a temperature T <0° C. have relatively low permeabilities at room temperature of approximately just 25% of those of ferrites having a secondary permeability maximum which is at a temperature T=+25° C. Although that is indeed a limitation, it is one which is very largely compensated for by the virtually pressure-independent inductance that is achieved. After encapsulation or potting with plastic, the inductance changes then amount to only 3 to 4%. Depending on the degree of purity of the raw materials, the permeability values which can be achieved at room temperature are then approximately 3000 to 7000.

Upon making a comparison of the diagrams according to FIGS. 1 and 2, which respectively show the profile of the initial permeability μi as a function of the temperature T in °C., it is apparent that, in the case of MnZn ferrite having a secondary permeability maximum (abbreviated as SPM) at a temperature<0° C., compared to such a ferrite having a secondary permeability maximum at a temperature>0° C., virtually unchanged inductance values are retained under the effect of mechanical pressure in a temperature range of interest in terms of applications, from approximately room temperature to 130° C., under the effect of mechanical pressure due to potting or encapsulation with plastic. In FIGS. 1 and 2, the profile of the initial permeability μi before and after encapsulation or potting is indicated by reference numerals 10 and 11 in FIG. 1 and by reference numerals 20 and 21 in FIG. 2. In this case, the ferrites being used have virtually the same quantities in mol % with regard to the proportion of $Fe_2O_3$, MnO and ZnO. For a ferrite according to FIG. 1 which is used according to the invention, the proportion of $Fe_2O_3$ is in a range of 50 to 55 mol %, especially 53.20 mol %, the proportion of MnO is in a range of 15 to 35 %, especially 24.80 mol %, and the proportion of ZnO is in a range of 15 to 35%, especially 22.0%. The corresponding proportions for a ferrite having a secondary permeability at a temperature>0° C. are 52.60, 25.40 and 22.00 mol %.

We claim:

1. An inductive component, comprising:

a core formed of MnZn ferrites having high magnetic permeability and a secondary permeability maximum at a temperature <0°C.; and electricity insulating material encapsulating said core.

2. The inductive component according to claim 1, wherein said insulating material is plastic.

3. The inductive component according to claim 1, wherein said ferrites have an $Fe_2O_3$ content in a range of 50 to 55 mol %, a MnO content of 15 to 35 mol %, and a ZnO content of 15 to 35 mol %.

4. The inductive component according to claim 1, wherein said ferrites have an $Fe_2O_3$ content of 53.20 mol %, a MnO content of 24.80 mol %, and a ZnO content of 22.00 mol %.

* * * * *

UNITED STATES PATENT AND TRADEMARK OFFICE
CERTIFICATE OF CORRECTION

PATENT NO. : 5,738,949
DATED : April 14, 1998
INVENTOR(S) : Dieter Schaner et al.

It is certified that error appears in the above-identified patent and that said Letters Patent is hereby corrected as shown below:

On the title page:

Item [22] should read as follows:

Filed:    Jan. 12, 1996

Signed and Sealed this

Ninth Day of February, 1999

Attest:

*Acting Commissioner of Patents and Trademarks*

*Attesting Officer*